Nov. 12, 1968    Z. W. WILCHINSKY    3,411,001
APPARATUS AND PROCESS FOR ELIMINATING PREFERRED
ORIENTATION IN X-RAY DIFFRACTION IN CRYSTALS
Filed Oct. 22, 1965    5 Sheets-Sheet 1

INVENTOR.
ZIGMOND W. WILCHINSKY
BY
Donald F. Wolters
ATTORNEY

Nov. 12, 1968

Z. W. WILCHINSKY 3,411,001

APPARATUS AND PROCESS FOR ELIMINATING PREFERRED
ORIENTATION IN X-RAY DIFFRACTION IN CRYSTALS

Filed Oct. 22, 1965

United States Patent Office 3,411,001
Patented Nov. 12, 1968

3,411,001
APPARATUS AND PROCESS FOR ELIMINATING PREFERRED ORIENTATION IN X-RAY DIFFRACTION IN CRYSTALS
Zigmond W. Wilchinsky, Westfield, N.J., assignor to Esso Research and Engineering Company, a corporation of Delaware
Continuation-in-part of application Ser. No. 403,271, Oct. 12, 1964. This application Oct. 22, 1965, Ser. No. 501,755
16 Claims. (Cl. 250—51.5)

ABSTRACT OF THE DISCLOSURE

This invention concerns an apparatus and method by which the intensities comprising an X-ray diffraction pattern are averaged using a prescribed weighting factor in the averaging operation. The method may be used to eliminate the distortions in a diffraction pattern due to the presence of preferred orientation in the material under inspection.

---

Figure 1:
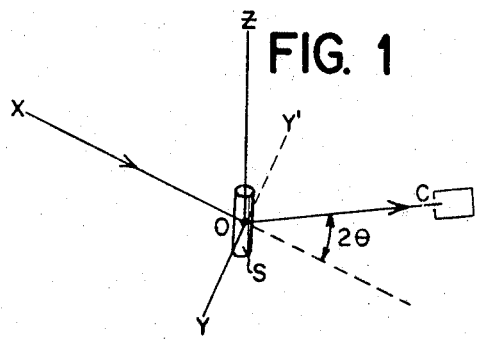

This application is a continuation-in-part of application Ser. No. 403,271, filed Oct. 12, 1964, now abandoned.

The present invention relates to X-ray diffraction patterns of crystalline or amorphous materials in powder or solid form having preferred orientation of crystals or molecules. In general, it concerns an apparatus and a process or method by which the intensities comprising an X-ray diffraction pattern are averaged, a prescribed weighting factor being used in the averaging. In particular, it provides for two types of operation which are important in the analysis of materials possessing preferred orientation. The first type of operation eliminates the distortions in a diffraction pattern due to the presence of preferred orientation. Thus, favorable conditions are established for studying the structure, degree of crystallinity, etc., in the presence of preferred orientation. In the second type of operation, an average orientation of crystal planes or of the molecules is measured. From such data, quantitative evaluations of the degree of orientation are determined. These two types of operations provide the means for studying the structure, degree of crystallinity, degree of orientation, etc., in various products from processes that produce preferred orientation.

A device for performing the aforementioned averaging will be referred to as a "preferred orientation integrator." However, the device will be referred to as a "preferred orientation compensator" when used specifically for eliminating the distorting effects of preferred orientation.

Accurate interpretations of X-ray diffraction patterns, such as "powder patterns" obtained by measurements of relative intensities, require that the patterns be those of samples in which the crystallites are randomly oriented. In many instances, however, it is impossible or impractical to obtain samples in which the crystallites are randomly oriented. In such instances, samples with some form of preferred orientation of the crystallites must be used. Samples which have a preferred orientation distort the relative intensities in the resulting diffraction patterns. This distortion of intensities, if not corrected by some valid means, renders impossible a truly accurate interpretation of a diffraction pattern. For example, if the diffraction pattern of isotactic polypropylene resin is compared to the diffraction patterns of polypropylene fiber having preferred orientation, it is readily seen that there are serious distortions in the diffraction patterns of the samples having preferred orientation. Such distortions preclude any meaningful measurement of the degree of crystallinity for example. It is, therefore, clear that a serious problem exists as regards distortions in the diffraction patterns of materials having crystallites of preferred orientation. Crystalline polyolefins are good examples of such materials, but the problem, and its solution according to the present invention, are not limited thereto.

In order to evaluate the X-ray diffraction patterns of materials in which preferred orientation exists, it is necessary to take the orientation into account. A possible method for accomplishing this is to measure the degree of orientation along with the associated intensity relationships, and to use this information to correct the diffraction pattern for the effects of preferred orientation. Such a procedure, although possible in principle, would require an exceedingly large amount of effort, hence it is considered impractical. According to the process of the present invention, it is possible in an automatic manner, to eliminate the distortions in the diffraction pattern due to preferred orientation of the crystallites and thus overcome the problems mentioned above.

Many single crystals exhibit anisotropy in their physical properties. When such substances are in the form of polycrystalline solids, their physical properties will show anisotropic behavior when the crystallites are preferentially oriented. Hence, in such polycrystalline solids, their orientation and their anisotropic behavior are interrelated.

In the process of the present invention, X-ray diffraction data are obtained in an automatic manner, from which data parameters for the quantitative evaluation of the preferred orientation of crystals or molecules is determined.

To consummate the aims of the present invention, a combination of two processes must take place synchronously. First, the sample must be subjected to a prescribed cyclic motion or a combination of cyclic motions. During this motion or combination of motions, the diffracted intensity is multiplied by a factor, $F(\phi)$, which is a function of $\phi$, a coordinate of the orientation; said function is generated and applied in synchronism with $\phi$ motion of the sample.

Figure 4:
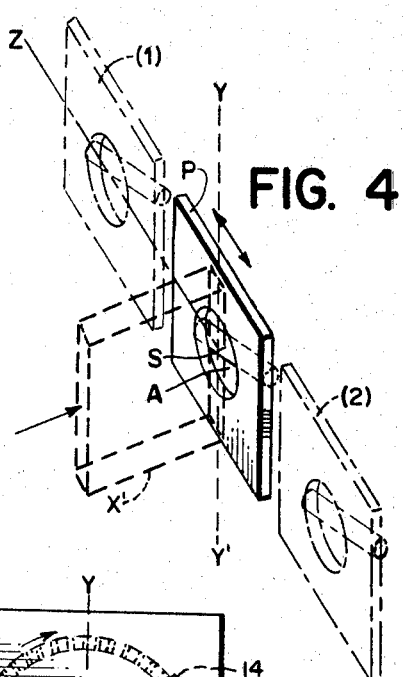
Figure 2:
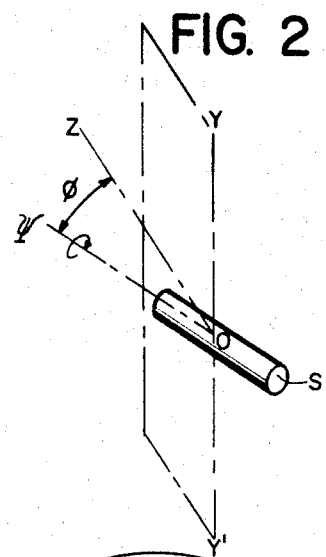
Figure 3:
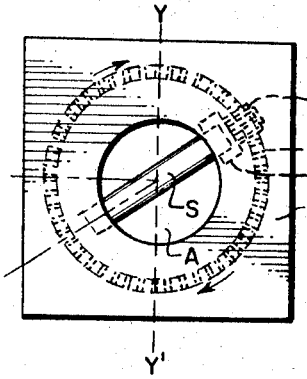
Figure 5:
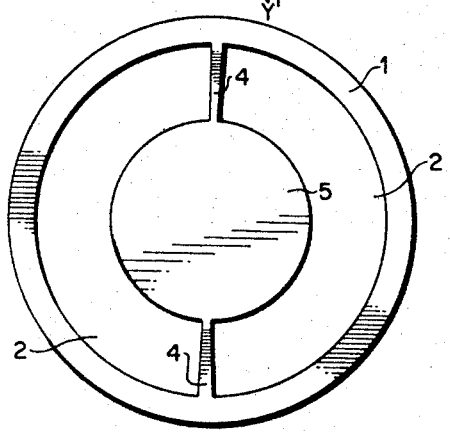

The invention will be better understood by referring to specific aspects and embodiments which are illustrated in the accompanying drawings and described in detail below. In the drawings, FIGURE 1 is a diagrammatical three dimensional illustration showing a sample diffracting X-rays. FIGURE 2 is a representation of rotational movements that can be imparted to a crystalline sample. FIGURE 3 is an enlarged face view of a simple mount for a sample. FIGURE 4 illustrates an additional movement that can be imparted to samples mounted as in FIGURE 3. FIGURE 5 shows a face view of a filter frame and FIGURE 6 a similar view of a variable filter element. FIGURE 7 is a graphical representation of a function generated by interposing a variable filter between a source of radiation and a crystalline material that is under study.

Figure 8:
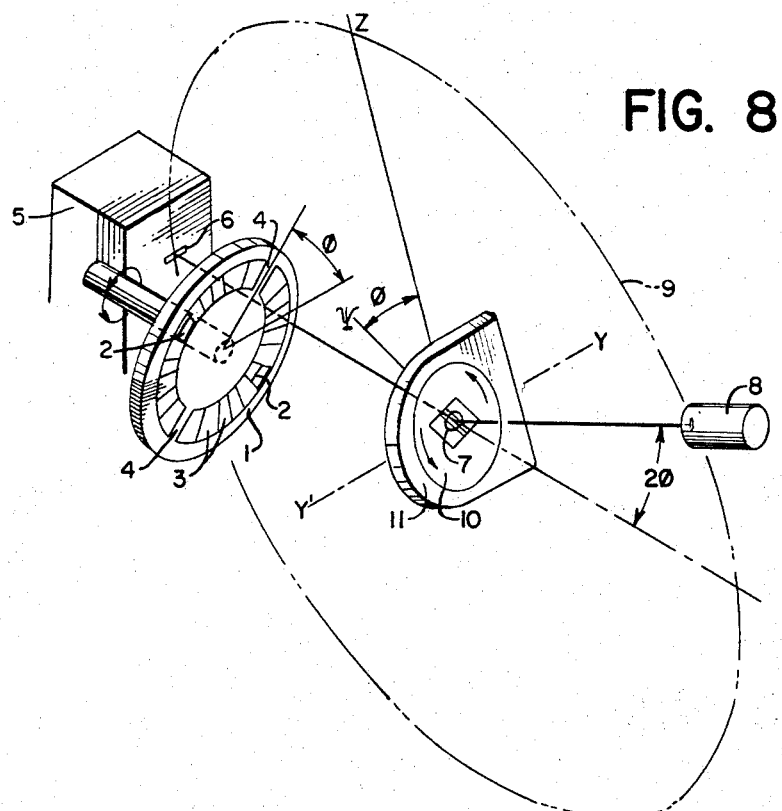

FIGURE 8 shows, somewhat diagrammatically, a mechanical system for rotating a sample while rotating a component of a function generator in synchronism with the rotation of the sample.

FIGURES 9A to 9F, inclusive, show typical traces obtained from the same sample under different conditions.

Figure 10:
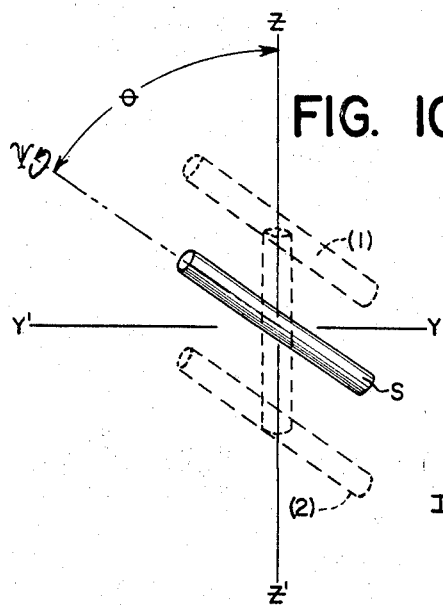

FIGURE 10 illustrates a system wherein provision is made for rotating a sample about its own axis and also in a plane containing such axis, while also providing for periodic and repeated translation or oscillation of the sample during such rotations.

Figure 11:
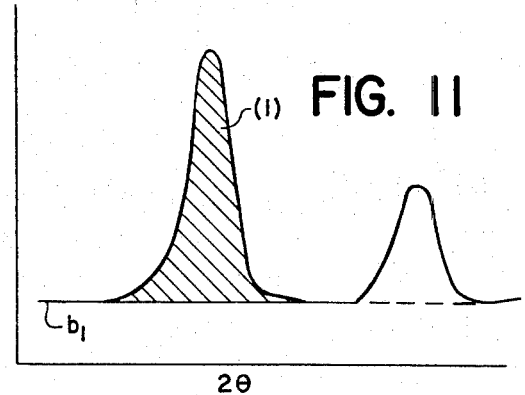
Figure 12:
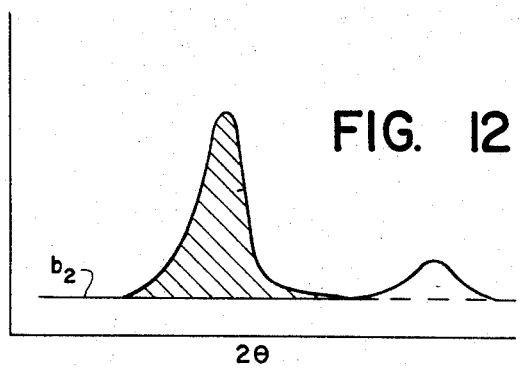
Figure 13:
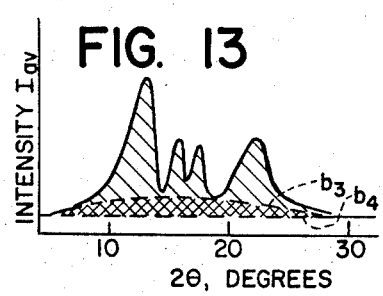
Figure 14:
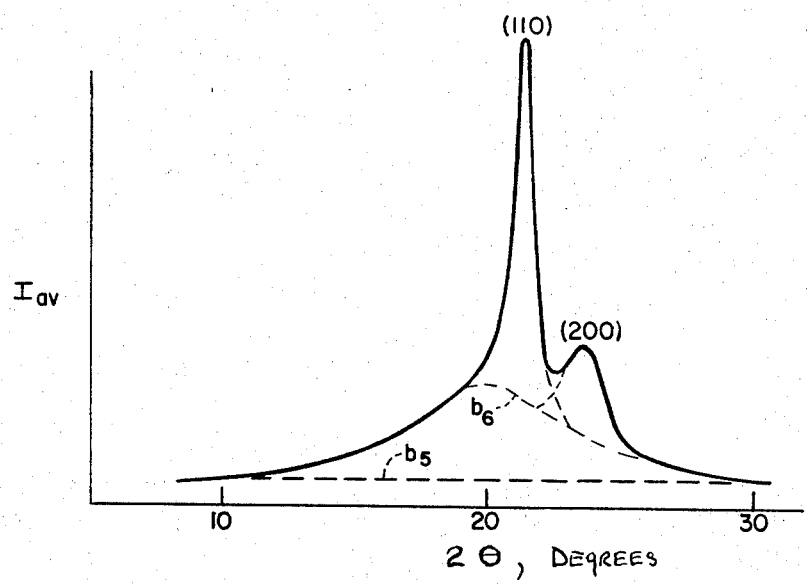
Figure 15:
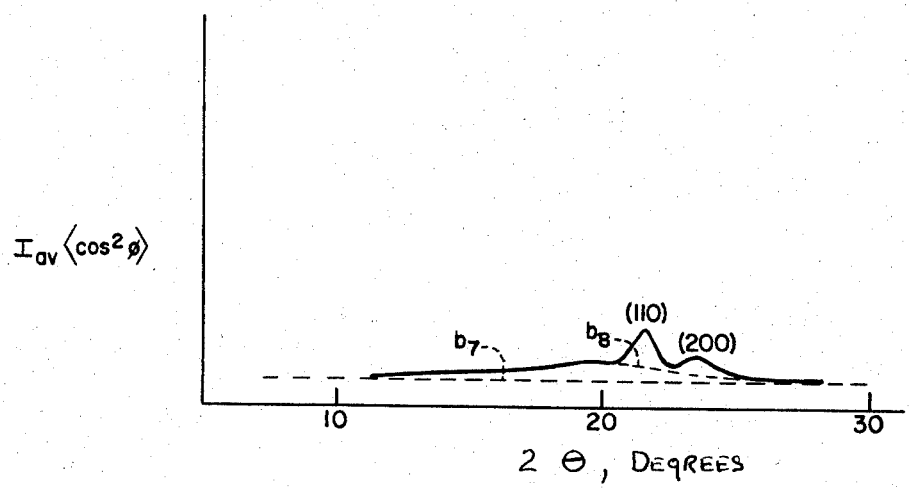

FIGURES 11, 12 and 13 show area diagrams which may be used in some applications to obtain greater accuracy and precision than by the use of simple intensity values; and FIGURES 14 and 15 show area diagrams for polyethylene fiber generally similar to FIGURES 11, 12 and 13.

In the process of the present invention, a sample of the material having crystallites or molecules of preferred orientation is prepared of suitable shape. This sample is placed into the sample holder of the preferred orientation integrator and is then positioned into the incident beam of an X-ray diffractometer, as indicated in FIGURE 1. The positioning of the sample can most easily be described with a sample of cylindrical shape, although other geometries can also be used, as will subsequently be discussed.

With reference to FIGURE 1, X-rays emerging from the source X are diffracted from the sample S; the diffracted rays, making an angle $2\theta$ with the incident beam, enter the slit of the X-ray quantum counter C. In the reference position shown, the axis of the sample is coincident with the bisector Z of the angle XOC. The direction YY' is perpendicular to the plane determined by the incident and diffracted beams; the directions Y and Z determine a plane perpendicular to the plane of the incident and diffracted beam. In the case of a cylindrical sample, the sample is rotated through an angle $\phi$ end over end in the YZ plane, while simultaneously the sample is spun or rotated through an angle $\psi$ about its axis, as indicated in FIGURE 2. The angle $\phi$ is taken as the angle between the Z direction and the axis of the $\psi$ rotation, or the cylinder axis. In the case of a spherical sample, the sample is spun about the $\psi$ axis which lies in the YZ plane, while simultaneously the position of this axis moves through an angle $\phi$ in YZ plane. The period of $\phi$ rotation of the sample and the period of spinning (i.e., $\psi$ rotation) should both be short compared with the time constant of the diffractometer recorded. For example, if the time constant of the recorded is four seconds, the period of the $\phi$ rotation of two or more times per second and the period of spin about five or more times per second should generally be satisfactory. The ratio of the two rotation frequencies should preferably be an irrational number. The counter C travels along a circular path at a constant speed, thus varying the angle $2\theta$ at a constant rate. At each value of $2\theta$ the intensity of the diffracted beam is measured by the counter and recorded on a strip chart. Concurrent with the measuring of the intensity for each different value of $2\theta$, a factor $F(\phi)$ is sent to the recorder. This factor can be generated mechanically by insertion of a variable absorption filter disk in the path of either the incident X-ray beam or the diffracted beam, or electronically by varying the X-ray intensity emitted by the X-ray tube, or by a function generator that modifies the signal to the recorder after the diffracted beam has entered the counter. In any case, the factor $F(\phi)$ must be synchronized with the $\phi$ rotation of the sample. The normal diffracted intensity is multiplied by the factor $F(\phi)$, either optically or electronically, the product being the resultant intensity recorded on the strip chart.

If the function $F(\phi)$ is chosen to be $F(\phi)=\sin \phi$, then the diffraction pattern which is recorded on the diffractometer recorder is free from distortions caused by the preferred orientation. In essence, the process and apparatus of the present invention have averaged the diffracted intensities in such a manner that the resulting intensity recorded on the diffractometer recorded is independent of the preferred orientation in the sample.

A mathematical equation for the operation can be expressed as follows:

$$I_{av}=\frac{1}{\pi}\int_0^\pi \left[\frac{1}{2\pi}\int_0^{2\pi} I(\phi,\psi)d\psi\right]\sin\phi d\phi \qquad (1)$$

where $I_{av}$=the average intensity recorded at a diffraction angle $2\theta$. $I(\phi,\psi)$=instantaneous diffracted intensity corresponding to the angular coordinates $\psi$ and $\phi$ of the sample. This intensity $I(\phi,\psi)$ is also proportioned to an orientation distribution function describing the orientation of crystal planes or molecule chains. In the case of crystal planes, the coordinates $\phi$ and $\psi$ specify the orientation of the crystal planes which give rise to the intensity $I(\phi,\psi)$. Equation 1 implies that through the combinations of the $\psi$ and $\phi$ rotations, each crystal has been in many possible spatial positions. In only two of these many positions, a crystal can diffract X-rays from a specific set of crystal planes in accordance with Bragg's law of diffraction. Another implication of Equation 1 is that the contribution to the average diffracted intensity from each crystal is proportional to its volume and is independent of its orientation in the sample.

Still another implication is that the variation in $I(\phi,\psi)$ occurring during the variations of the coordinates $\phi$ and $\psi$, is due only to the preferred orientation in the sample and not to extraneous variables in diffraction geometry. To fulfill the predictions of Equation 1, the effects of absorption of X-rays in the sample should be negligible, an dthe participating crystals should be constantly bathed in the X-ray beam having a uniform intensity over its entire cross section. These requirements, or their equivalents, can be essentially fulfilled in several practical procedures.

The embodiment of this invention may take a variety of forms, several of which are described below for samples of different physical forms.

*Case 1.—Specimen completely bathed in X-ray beam*

If the sample is small so that it is completely bathed in the incident beam, and if the slits at the counter have sufficiently large openings to admit diffracted rays from any part of the sample, then the sample is treated essentially as described above. The sample is mounted in the X-ray beam so that the $\psi$ axis preferably passes through the center of the sample; however, in other respects the relation of the sample to the $\psi$ axis is not very critical. The sample is then spun through the $\psi$ motion and rotated through the $\phi$ motion while the factor $\sin \phi$ is generated synchronously with the $\phi$ rotation. Simultaneously, the counter scans through the desired range of diffraction angles ($2\theta$). The resulting diffraction pattern in accordance with Equation 1 will be free of preferred orientation effects.

*Case 2.—Fibrous specimen*

If the sample consists of fibers and in each fiber crystallites are oriented in a cylindrically symmetrical distribution, the diffracted intensity will not change if a fiber is rotated through an angle $\psi$ about the fiber axis. Therefore, it is unnecessary to spin the sample through the $\psi$ rotation, hence, only the $\phi$ rotation is necessary to obtain $I_{av}$ of Equation 1. To enhance the diffracted intensity, the fibers may be wound parallel to each other on a flat frame having a circular aperture to form a sheet of uniform thickness. The body of this flat frame is opaque to the X-rays. It is then easily arranged to have the incident beam intercept a constant volume of sample at all values of $\phi$. The plane of this flat sample is in the YZ plane of FIGURE 1 and is rotated through the $\phi$ motion during the scan over the desired range of diffraction angles $2\theta$. The position $\phi=0$ corresponds to the position when the fibers are parallel to the Z direction in FIGURE 1.

If a film or plane sheet is known to have a preferred orientation which has cylindrical symmetry with respect to some direction in the plane of the film or sheet, then the above procedure can also be used. When the axis of cylindrical symmetry is parallel to Z, then $\phi=0$.

The factor $\sin \phi$ is generated synchronously with the $\phi$ rotation while the counter scans through the desired range of $2\theta$. The resulting pattern on the recorder trace will be free of preferred orientation effects.

*Case 3.—Large specimen, arbitrary orientation*

The more general case of powders or of a massive solid can be handled by shaping the samples into the form of a cylinder or sphere; however, the cylindrical form is usually more practical. In this case, it is important that the absorption of X-rays in the sample should not seriously interfere with the measurements. This can be done, for example, by selecting a specimen diameter small enough so that the absorption effects will be negligible. An aperture, consisting of a circular hole A in a sheet of metal opaque to the X-ray beam, is in close proximity of the sample and the plane determined by the sheet is parallel to the YZ plane of FIGURE 1. The axis of the $\phi$ rotation passes through the center of the aperture, as indicated in FIGURE 3. A suitable means are also provided to continuously rotate sample S about an axis of the sample through an angle $\phi$. These means may include, for example, a circular rack and pinion type arrangement such as indicated by reference numerals 12 and 14. Pinion 14 is attached to a sample engaging means 16. This aperture insures the irradiation of a selected portion of the sample. In addition to the $\phi$ and $\psi$ motions described earlier, a third motion is required. This is a translation motion which carries the sample in the YZ plane through the X-ray beam. With reference to FIGURE 4, the sample S and aperture A oscillate at a uniform velocity between position (1) on one side of the X-ray beam, to position (2) on the opposite side of the beam. This motion, which will be referred to as the Z motion, insures that every crystallite within the limits of the aperture will be exposed to the X-ray beam for the same length of time. The period of oscillation should be rather short compared to the time constant of the recorder, and the ratios of this period to the periods of the $\phi$ and $\psi$ rotation should be irrational numbers. In operation, the counter scans through a selected range of $2\theta$ (diffraction angles) while the sample simultaneously moves through the $\psi$, $\phi$ and Z motions, and the factor $\sin \phi$ is generated synchronously with the $\phi$ motion. The resulting diffraction pattern traced out on the recorder will be free of preferred orientation effects.

If the orientation has a cylindrically symmetrical distribution and the sample cannot be handled by Case 2, it can be handled by the present procedure without, however, the necessity to rotate the sample through the $\psi$ motion.

In order to describe more clearly the process of the present invention, the following example showing how the process is used to study the diffraction pattern of a highly oriented polypropylene fiber is included. The orientation in the fiber had a cylindrically symmetrical distribution, hence the procedure of Case 2, requiring only the $\phi$ rotation, was used. In the process an X-ray diffractometer was adapted with an orientation compensator comprising a sample holder and a filter disk constructed of aluminum metal and Mylar plastic such that the disk would give the attenuation $\sin \phi$ of the incident beam at an angular position $\phi$ on the disk. This disk was placed in the X-ray beam between the X-ray source and the sample.

A Norelco diffractometer was used. With reference to FIGURE 1, a collimated beam from a stationary X-ray source X irradiated the sample located at point O a distance of 17.3 cm. from X. The counter C, also 17.3 cm. distant from O, moved along an arc of a circle whose center is at O. This circle is in a vertical plane. While the counter traveled slowly at a uniform angular speed about the axis YY' passing through O, the YZ plane of the sample also was rotated slowly about this axis but at half the angular speed of the counter. A Norelco flat sample spinner was used as the sample holder to hold the sample and to execute the $\phi$ motion. After the sample spinner was aligned, the plane of its face always bisected the angle XOC, because of the aforementioned 2:1 rotational relationship between the sample holder and the counter. The sample employed was prepared from a highly oriented resin, specifically polypropylene fiber. The resin, consisting of a commercial type isotactic polypropylene, was spun at about 290° C. into the form of a monofilament. In a second operation this monofilament was drawn at about 130° C., the drawn ratio being nominally 7:1.

The sample was prepared by winding the fibers around a thin meal plate P about ½ inch square with an aperture A of ¼ inch diameter. Care was taken to have the fibers as nearly parallel to each other as possible and to maintain a uniform thickness of fibers over the aperture. The thickness of the sample was about ⅟₁₆ inch. This flat sample was then mounted on the face of the sample spinner. By means of sychronous motor drives, the $\phi$ rotation of the flat sample spinner was synchronized with the rotation of the filter disk. These synchronized rotations were performed while a diffraction pattern was obtained by scanning between the diffraction angles $2\theta=8°$ and $2\theta=32°$. The resultant signal from the counter circuit was recorded on a strip chart recorder. For recording, a strip of coordinate paper is moved in the longitudinal direction, at a constant speed which is synchronized with the scanning rate of the X-ray counter. Therefore, the distance along the chart is proportional to the diffraction angle $2\theta$. Furthermore, a recorder pen, synchronized with the dial which reads the angle $2\theta$, produces a characteristic mark on the chart whenever the dial reading is an integral number of degrees or a half integral number. A second recorder pen moves transversely across the chart, the distance from the bottom of the chart being proportional to the intensity signal sent to the recorder.

Figure 6:
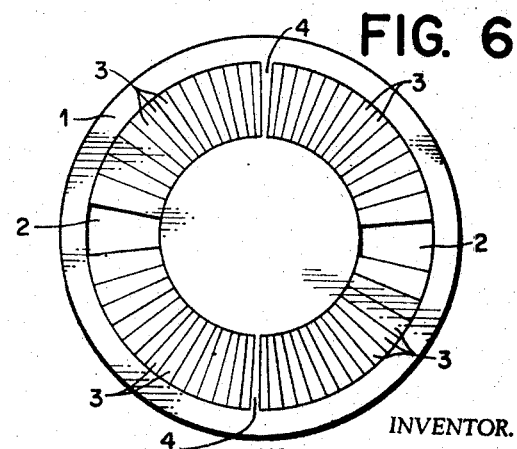
Figure 7:
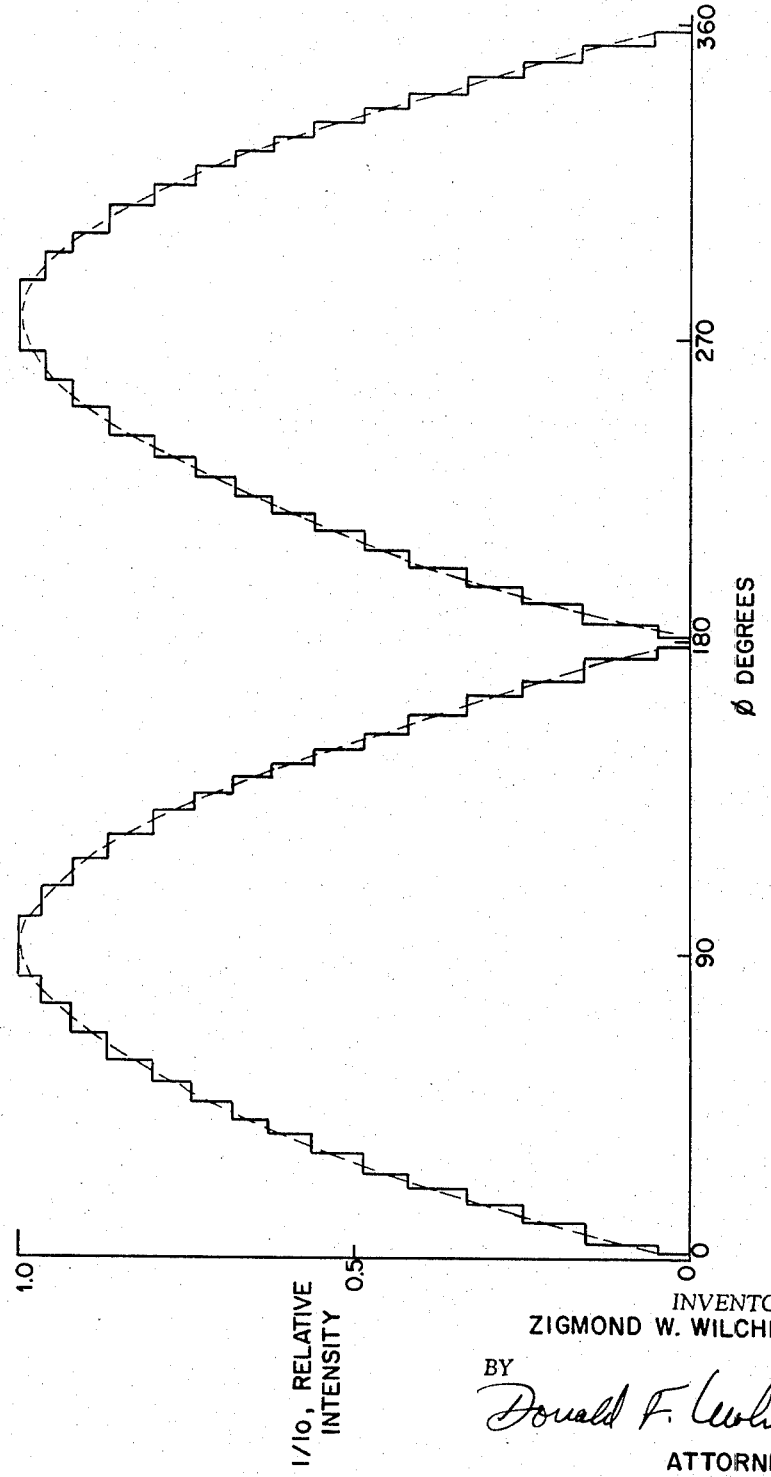

Further details of the apparatus and its operation can be described with the aid of FIGURES 5 through 9. FIGURES 5 and 6 show the construction of the filter disk; FIGURE 7 shows the absorption response of the disk; and FIGURE 8 shows the relationship of the essential components.

With reference to FIGURE 5, the frame of the filter disk was constructed from a circular aluminum plate 1 about ⅟₁₆ inch thick and 6 inches in diameter. Two arcuate openings 2 were cut in this plate. Absorbing materials 3 were then fastened onto sectors of this frame as indicated in FIGURE 6; however, the sectors of absorbers 3 consisted of various thicknesses of layers of Mylar and aluminum sheet. The two absorbers 4 consisted mainly of ⅟₁₆ inch thick aluminum plate integral with parts 1 and 5 from which the frame was constructed and were completely opaque to X-ray beam. The sectors of absorbing materials 3 were arranged so that the relative intensity of the incident X-day beam transmitted through the sector located at an angular position $\phi$ was very nearly equal to $\sin \phi$, as shown by the step curve in FIGURE 7. A sine curve shown by the broken line is included to indicate the closeness of the approximation.

The experimental arrangement is shown schematically in FIGURE 8. X-rays, generated within the housing 5 are collimated by the slit system 6. These rays encounter the sectors of the filter disk 1 before encountering the fiber sample 7. The X-ray quanta diffracted at angle $2\theta$ then enter the detector 8 of the counter system. This detector moves along the vertical circle 9.

A synchronous motor drive (not shown) was provided to rotate the filter disk at 78 revolutions per minute. The sample was mounted on a rotating stage 10 of the flat sample spinner 11. By means of a synchronous drive (not shown) similar to that used for the disk 1, the sample stage 10 was rotated at the same angular speed as the disk (78 r.p.m.). Initially, the sample 7 and disk 1 were set to $\phi=0$. For this condition, the fibers were parallel to the Z direction and the centers of the completely opaque sectors 4 of the disk were horizontal, thus completely absorbing the beam. The synchronous motor drives of the disk and sample were then started simultaneously. At any later time, the angular positions $\phi$ of the sample were the same as that for the disk.

Figure 9A:
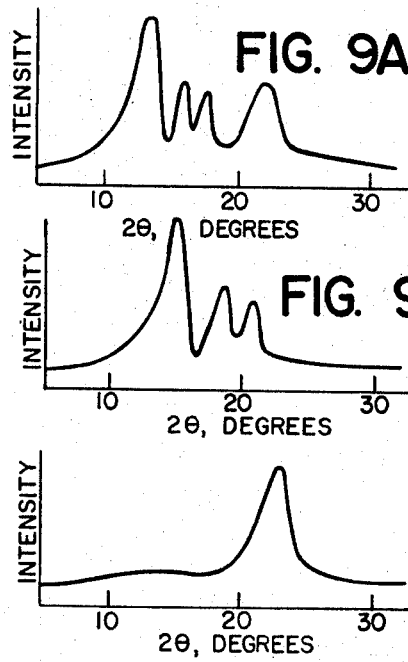
Figure 9B:
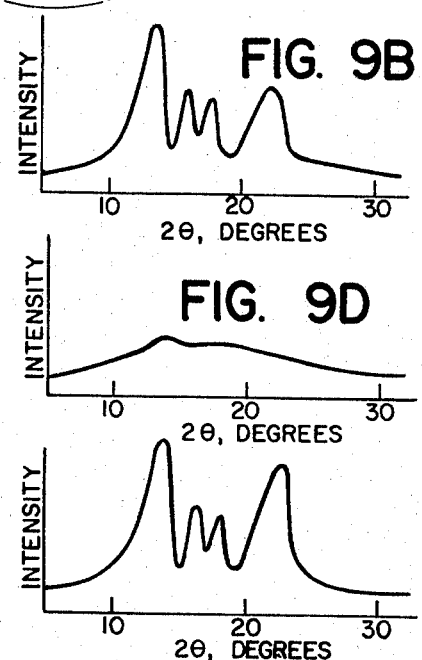
Figure 9C:
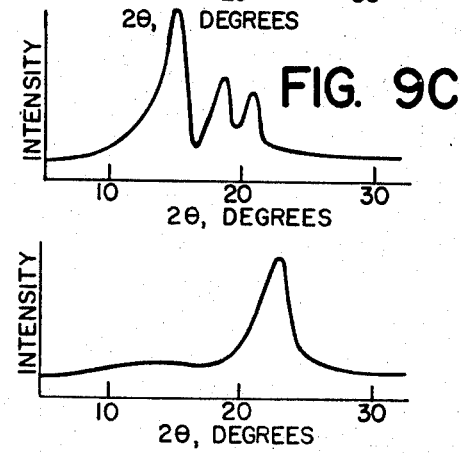
Figure 9D:
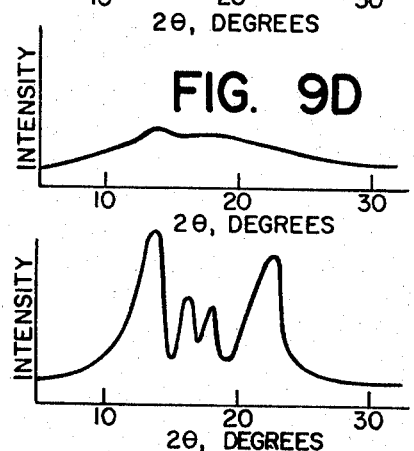
Figure 9E:
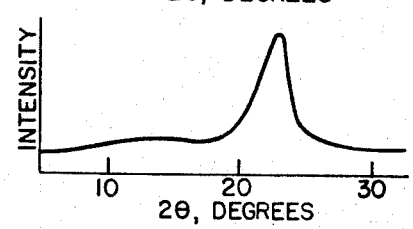
Figure 9F:
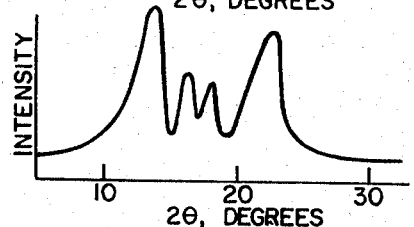

The diffraction pattern obtained with the use of the preferred orientation compensator is shown in FIGURE 9A. To verify that this pattern is the same as would be obtained if the crystallites were in random orientation, a random sample was simulated by the tedious process of tieing many knots in the fiber and rolling the knotted fiber into a compact sphere. The pattern of this randomized fiber is shown in FIGURE 9B. It can be noted that the relative intensities in this pattern and in FIGURE 9A bear the same relations to each other. By contrast, if the orientation compensator were not used for the oriented fibers of the sample used in FIGURE 9A, the relative intensities could be seriously distorted. FIGURE 9C shows the pattern obtained when the fibers were maintained in a horizontal position (in the YY' direction of FIGURE 1). Only the first three peaks appeared in the pattern. When the fibers were maintained parallel to the Z direction of FIGURE 1, the pattern obtained was essentially devoid of diffraction peaks, as shown in FIGURE 9D. For an intermediate position of the sample, the pattern obtained is shown in FIGURE 9E; it contains only the fourth peak.

If the sample is rotated through the $\varphi$ motion, but the factor sin $\phi$ is not introduced, the intensities, in general, will not be in their proper relationships to each other. The seriousness of the distortion depends on the crystallographic origins of the diffracting crystal planes which give rise to the respective peaks and the nature of the preferred orientation. For the polypropylene fiber sample, the pattern in FIGURE 9F was obtained when the sample was rotated through the $\phi$ motion, but the synchronizing filter disk was not used. A comparison with FIGURES 9A or B shows that the intensity of the fourth peak is exaggerated in relationship to the first three peaks.

This example ilustrates the nature of the distortions in a diffraction pattern that could be caused by preferred orientation of the crystallites, and shows that the distortions which result because of preferred orientation were eliminated by the use of the process of the present invention.

The method and apparatus described in the cases above, as in the parent application Ser. No. 403,271 are useful to average out the distortions due to preferential orientation. It is often desirable, however, to get more information as to the orientation of crystals or molecules. This extended application of the present invention is described in the following discussion.

A sample S is rotated at a constant rate in the YZ plane, FIGURE 10. The angle $\phi$ represents the instantaneous angle of rotation. As indicated in this figure and also in FIGURE 2, the sample is rotated at the same time about an axis fixed in the sample through an angle $\psi$. In addition to these two motions, the sample is oscillated in translation between limiting positions (1) and (2).

In terms of the rotation of the sample through the angles $\phi$ and $\psi$, a parameter $<\cos^2 \phi>$, often used in characterizing the degree of orientation is given by the equation:

$$\langle \cos^2 \phi \rangle = \frac{\frac{1}{2\pi^2} \int_0^\pi \int_0^{2\pi} I(\phi, \psi) \cos^2 \phi \sin \phi d\psi d\phi}{\frac{1}{2\pi^2} \int_0^\pi \int_0^{2\pi} I(\phi, \psi) \sin \phi d\psi d\phi} \quad (2)$$

where $I(\phi, \psi)$ is the distribution of diffracted intensity from the crystal planes used, obtained by averaging the diffracted intensity over the Z motion at the sample positions given by $\phi$ and $\psi$.

The denominator of Equation 2 is the average intensity $I_{av}$ obtained by the method of FIGURES 1 to 9. This quantity is related to the intensity $I_R$ which would be obtained if the crystallites were randomly oriented by the equation:

$$I_{av} = \frac{2}{\pi} I_R = \frac{1}{2\pi^2} \int_0^\pi \int_0^{2\pi} I(\phi, \psi) \sin \phi d\phi \quad (3)$$

The numerator of Equation 2 is therefore $$\frac{2}{\pi} I_R \langle \cos^2 \phi \rangle = I_{av} \langle \cos^2 \phi \rangle$$

From Equations 2 and 3 it can be concluded that $<\cos^2 \phi>$ is an average obtained by weighting the function $\cos^2 \phi$ by a normalized orientation distribution function $I(\phi, \psi)/I_{av}$ and averaging over all orientations. The average $<\cos^2 \phi>$ is always considered with respect to or in the direction of the axis of the $\psi$ rotation actual, or implied.

To obtain the numerator in Equation 2, a procedure similar to that used for the denominator is followed. However, in the case of FIGURE 10, as the sample is rotated through the $\psi$, $\phi$ and Z motions, a factor $\cos^2 \phi \sin \phi$ is generated in synchronism with the $\phi$ rotation. The intensity $I(\phi, \psi)$ is multiplied by this factor and the resulting product is measured or recorded on a strip chart. This function or factor $\cos^2 \phi \sin \phi$ may be generated by optical, mechanical or electrical means, or by a combination, as will be understood by those skilled in the art.

The same considerations with regard to orientation symmetry and diffraction geometry may be applied to the measurement of the values $I_{av}<\cos^2 \phi>$ as for measuring $I_{av}$.

By an extension of this method, it is evident that the average of any desired function of $\phi$, say $f(\phi)$, can be obtained. To obtain this average, designated $<f(\phi)>$, the function $f(\phi) \sin \phi$ is generated, the product of this modified function and the intensity $I(\phi, \psi)$ is integrated over all the orientations, and the result of these operations is divided by $I_{av}$. Such an average can be expressed by the equation:

$$\langle f(\phi) \rangle = \frac{\int_0^\pi \int_0^{2\pi} I(\phi, \psi) f(\phi) \sin \phi d\psi d\phi}{\int_0^\pi \int_0^{2\pi} I(\phi, \psi) \sin \phi d\psi d\phi} \quad (4)$$

In some systems using the process of this invention, in some cases the intensity may vary with the rotation $\phi$ due to purely geometric causes. When it can be determined that the observed intensity $I(\phi, \psi)$ must be multiplied by a factor, say $g(\phi)$ to compensate for such a geometric effect, then the expression in Equation 4 should be modified as follows:

$$\langle f(\phi) \rangle = \frac{\int_0^\pi \int_0^{2\pi} I(\phi, \psi) g(\phi) f(\phi) \sin \phi d\psi d\phi}{\int_0^\pi \int_0^{2\pi} I(\phi, \psi) g(\phi) \sin \phi d\psi d\phi} \quad (5)$$

Thus, to obtain the denominator (which is $I_{av}$), the factor $g(\phi) \sin \phi$ is generated simultaneously with the $\phi$ rotation of the sample. This factor is generated by means similar to those described for generating the sin function, FIGURES 5 to 7, above. In a similar manner, the factor $g(\phi) f(\phi) \sin \phi$ is generated simultaneously with the $\phi$ rotation, in evaluating the numerator of Equation 5. In principle, this process using the additional factor $g(\phi)$ can be used without subjecting the sample to the translatory Z motion, since the purpose of this motion is also to eliminate variations of diffracted intensity due to geometric causes while the sample is moved through the $\phi$ rotation.

In each of Equations 2, 3, 4 and 5, the averages were calculated at a fixed value of the diffraction angle $2\theta$. The type of scans obtained by the method of FIGURE 10, as just described, are shown in FIGURES 11 through 15. Although intensity measurements can be used, to obtain the desired information for the diffraction peaks indicated, higher accuracy is obtained by using areas under the peaks. The procedures of Equations 2, 3, 4 and 5 are carried out while the diffractometer scans through a selected range of diffraction angle $2\theta$. To obtain the desired information for the first peak in FIGURES 11 and 12, for example, the areas above baselines $b_1$ and $b_2$, shown in diagonal hatching, are measured. These values may be designated A(N) and A(D) for numerator and denominator, respectively. In terms of these areas, the average $\langle f(\phi)\rangle$ of Equation 4 or 5 becomes simply $$\langle f(\phi)\rangle = \frac{A(N)}{A(D)} \quad (6)$$

Similar information can be obtained for the second unshaded peak in each of FIGURES 11 and 12 and the method can readily be extended to more complex patterns as in FIGURES 13, 14 and 15.

Where the sample material consists of matter in the amorphous or paracrystalline states, the diffraction pattern consists of very broad peaks instead of the relatively sharp peaks that are obtained for crystalline phases. Information about orientation of these phases can be obtained by extension of the procedure described.

For cases where mixtures of phases are present in an oriented sample, the amounts of each phase can be determined from area measurements. FIGURE 13 represents a trace of $I_{av}$ for polypropylene fiber similar to that shown in FIGURE 9A. The base line $b_3$ in FIGURE 13 is established to resolve the individual peaks due to the crystalline phase from the broad peak due to the amorphous phase. A second base line $b_4$ is established as a background level. The amount of crystalline material is proportioned to the area of the aggregate of the crystalline peaks shown by diagonal hatching, while the amount of amorphous material is proportional to the area of the broad amorphous peak shown by cross hatching. From the ratio of these areas, the percentages of the crystalline and amorphous contents can be determined. For example, from our work we have established that the crystalline content X, expressed as a percentage, is $$X = \frac{1}{1 + 1.05 \left(\frac{\text{amorphous area}}{\text{crystalline area}}\right)}$$

The measurement of the orientation parameter $\langle \cos^2 \phi \rangle$ for crystalline and amorphous materials is illustrated in the following example for polyethylene fiber. In accordance with the process of this invention, the trace for the denominator of Equation 2 is shown in FIGURE 14, and the trace for the numerator is shown in FIGURE 15. The crystalline and amorphous areas are established by the base lines $b_5$, $b_6$, $b_7$ and $b_8$, as described in the preceding example. In addition, the two crystalline peaks, designated by their crystal plane indices (110 and 200), are resolved from each other. The ratio of the areas of the respective peaks in the two traces were obtained in accordance with Equation 6. Since $f(\phi) = \cos^2 \phi$ in the present case, the ratio is $\langle \cos^2 \phi \rangle$. For the three sets of peaks, the results are:

$$\langle \cos^2 \phi \rangle_{110} = 0.10$$
$$\langle \cos^2 \phi \rangle_{200} = 0.15$$
$$\langle \cos^2 \phi \rangle_{\text{amorph.}} = 0.20$$

It can be shown that the orientation parameters for the molecule axis in the amorphous fraction and for the $a$, $b$ and $c$ crystallographic axis in the crystalline fraction of polyethylene are expressable in terms of the above parameters as follows:

$$\langle \cos^2 \phi \rangle_{\text{mol}} = 1 - 2 \langle \cos^2 \phi \rangle_{\text{amorph.}}$$
$$\langle \cos^2 \phi \rangle_a = \langle \cos^2 \phi \rangle_{200}$$
$$\langle \cos^2 \phi \rangle_b = 1.445 \langle \cos^2 \phi \rangle_{110} - 0.445 \langle \cos^2 \phi \rangle_{200}$$
$$\langle \cos^2 \phi \rangle_c = 1 - 1.445 \langle \cos^2 \phi \rangle_{110} - 0.555 \langle \cos^2 \phi \rangle_{200}$$

Thus the numerical values for the orientation parameters in the direction of the fiber axis are as follows:

crystal $a$ axis, $\langle \cos^2 \phi \rangle_a = 0.15$
crystal $b$ axis, $\langle \cos^2 \phi \rangle_b = 0.056$
crystal $c$ axis, $\langle \cos^2 \phi \rangle_c = 0.794$
molecule axis, amorphous phase, $\langle \cos^2 \phi \rangle_{\text{mol}} = 0.60$ It will be apparent to those skilled in the art that although the illustration used herein employed polypropylene and polyethylene fibers, the method is applicable to other materials in which preferred orientation of the crystals or molecules exists.

What is claimed is:

1. A process for obtaining a weighted average intensity in the X-ray diffraction pattern of crystalline or amorphous materials having crystals or molecules of preferred orientation comprising the steps of providing an incident X-ray beam from an X-ray source; placing a sample of said material in said beam, thereby producing a diffracted beam; continuously rotating said sample about its axis through an angle $\psi$, said axis being in a plane normal to the plane determined by said incident and diffracted beams, and said plane bisecting the angle formed by said incident and diffracted beams; continuously rotating said sample so that said $\psi$ axis rotates end over end through an angle $\phi$ in said plane normal to the plane determined by said incident and diffracted beams; attenuating, in synchronism with the $\phi$ rotation of the said sample, one of said beams so its intensity is directly proportional to a function $F(\phi)$; oscillating a selected portion of said sample through said incident beam at a uniform linear velocity in a direction parallel to the bisector of the angle formed by said incident and diffracted beams, said oscillation giving all crystals or molecules in said selected portion a substantially equal exposure in said incident beam; and detecting and recording the diffracted beam over the cycle of said $\phi$ rotation.

2. A process according to claim 1 in which the function $F(\phi)$ is $\sin \phi$.

3. A process according to claim 2 in which the sample is a single crystal.

4. A process according to claim 2 wherein said incident X-ray beam is attenuated by use of a variable X-ray absorption filter disc.

5. A process according to claim 4 wherein said filter disc is located in the incident beam between the X-ray source and the sample.

6. A process according to claim 4 wherein said filter disc is located in the diffracted beam between the sample and the means for detecting and recording said beam.

7. A process according to claim 2 wherein said incident beam is attenuated so as to be proportional to the sin of $\phi$ by electronically varying the X-ray intensity emitted by the X-ray source.

8. A process according to claim 1 in which the function $F(\phi)$ is $g(\phi) \sin \phi$, the factor $g(\phi)$ operating to compensate for variations in diffracted intensity due to geometric causes while the sample position is varied through the angle $\phi$.

9. A process for obtaining a weighted average intensity, $I_{av}\langle f(\phi)\rangle$, in the diffraction pattern of amorphous or polycrystalline materials having molecules or crystals of preferred orientation, said process being carried out in accordance with claim 1, in which the function $F(\phi)$ is $f(\phi) \sin \phi$; the factor $I_{av}$ is obtained by a similar process in which the function is $\sin \phi$.

10. A process for obtaining a weighted average intensity $I_{ev}\langle f(\phi)\rangle$ in the diffraction pattern of amorphous or polycrystalline materials having molecules or crystals of preferred orientation, said process being carried out in accordance with claim 1, in which the function $F(\phi)$ is $g(\phi) f(\phi) \sin (\phi)$, the factor $g(\phi)$ being included to compensate for variations in diffracted intensity due to geometric causes while the sample position is varied through the $\phi$ angle; the factor $I_{av}$ in the weight average intensity $I_{av}$ is obtained by a similar process in which the function is $g(\phi) \sin \phi$.

11. A process for eliminating the distortions in the diffraction pattern of a material having crystals or molecules of preferred orientation which comprises providing an incident X-ray beam; completely bathing a sample of said material in said incident beam thereby producing a diffracted beam; continuously rotating said sample about an arbitrary axis through an angle $\psi$, said axis being in a plane normal to the plane determined by said incident and diffracted beam and said plane bisecting the angle formed by said incident and diffracted beams; continuously rotating said sample so that said $\psi$ axis rotates end over end through an angle $\phi$ in said plane normal to the plane determined by said incident and diffracted beams modifying the intensity of said incident beam so that it is directly proportional to the sin of $\phi$ and automatically detecting, averaging and recording the diffracted beam over the cycle of said $\phi$ rotation.

12. A process for eliminating the distortions in the diffraction pattern of a material having crystals or molecules oriented in a cylindrically symmetrical distribution which comprises providing an incident X-ray beam; placing a sample of said material in said incident beam, thereby producing a diffracted beam; continuously rotating said sample so that the cylindrical symmetry axis rotates end over end through an angle $\phi$ in a plane normal to the plane determined by said incident and diffracted beams, said plane bisecting the angle formed by said incident and diffracted beams; oscillating through said incident beam at a uniform linear velocity in a direction parallel to the bisector of the angle formed by said incident and diffracted beams a selected portion of said sample, said oscillation giving all crystallites in said selected portion an equal exposure in said incident beam; modifying the intensity of said incident beam so that it is directly proportional to the sin of $\phi$; detecting and recording the intensity of the diffracted beam.

13. A method for eliminating distortions in the diffraction pattern of a material having crystallites of preferred orientation which comprises in combination, the steps of providing an incident X-ray beam, continuously rotating the sample about an arbitrary axis extending through said sample through an angle $\psi$, which axis is in a plane normal to the plane determined by the incident and diffracted beams, and also simultaneously continuously rotating the sample so that the said arbitrary axis rotates end over end through an angle $\phi$ in said plane normal to the aforesaid plane, generating an electrical signal in synchronism with the $\phi$ rotation of said sample, said electrical signal being directly proportional to a nonlinear function of $\phi$; forming the instantaneous product of said electrical signal and the intensity of the diffracted beam, said intensity being that which results before said electrical signal is applied; automatically averging said product over the cycle of the $\phi$ rotation; detecting and recording said averaged product.

14. A preferred orientation integrator for use with a conventional X-ray diffractometer, said diffractometer comprising an X-ray source, a detector means, and a print-out means, said integrator comprises in combination:

(a) a sample spinner, said spinner interposed between said X-ray source and said detector means, said spinner further having means for engaging a sample of material, a first rotating means adapted to continuously rotate said sample about an axis of said sample, said axis being in a first plane normal to the plane determined by the incident X-ray beam from said X-ray source and the diffracted X-ray beam from said sample, said first plane bisecting the angle formed by said incident and diffracted beam; a second rotating means adapted to continuously rotate said sample so that said axis rotates end over end through an angle $\phi$ in said first plane; and (b) means for attenuating said incident X-ray beam in synchronism with the $\phi$ rotation whereby the intensity of said incident beam may be expressed as a function which is directly proportional to the sine of said angle $\phi$.

15. The apparatus of claim 14 wherein said sample holder also includes oscillating means adapted to impart a uniform linear velocity to said sample.

16. The apparatus of claim 14 wherein said beam attenuating means is a variable X-ray absorption disc interposed between said source and said sample.

References Cited

UNITED STATES PATENTS

| 2,500,926 | 3/1950 | Boyd | 250—51.5 |
| 2,761,068 | 8/1956 | Geisler | 250—51.5 |
| 3,079,499 | 2/1963 | Long | 250—51.5 |

OTHER REFERENCES

"Recent Developments in the Measurement of Orientation in Polymers by X-ray Diffraction," by Z. W. Wilchinsky, from Advances in X-ray Analysis, vol. 6, 1962, pp. 235–240.

WILLIAM F. LINDQUIST, *Primary Examiner*.